US008228522B2

(12) United States Patent
Hirabayashi

(10) Patent No.: US 8,228,522 B2
(45) Date of Patent: Jul. 24, 2012

(54) DOCUMENT DATA MANAGEMENT APPARATUS TO MANAGE DOCUMENT DATA READ AND DIGITIZED BY AN IMAGE READING APPARATUS AND A TECHNIQUE TO IMPROVE RELIABILITY OF VARIOUS PROCESSING USING DOCUMENT DATA

(75) Inventor: Kazunori Hirabayashi, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1199 days.

(21) Appl. No.: 11/668,184

(22) Filed: Jan. 29, 2007

(65) Prior Publication Data

US 2008/0180717 A1 Jul. 31, 2008

(51) Int. Cl.
*G06K 15/00* (2006.01)
*G06F 3/12* (2006.01)
*H04N 1/00* (2006.01)
*G11C 7/00* (2006.01)

(52) U.S. Cl. ............ 358/1.14; 358/1.15; 358/1.16; 358/1.6; 358/2.1; 365/195

(58) Field of Classification Search .......... 358/1.15, 358/1.14, 1.16, 1.17, 505, 474, 486, 452, 358/448, 401, 537, 523, 404; 714/41, 780; 700/21, 79; 365/194, 195
See application file for complete search history.

(56) References Cited

U.S. PATENT DOCUMENTS

| 4,010,445 | A | * | 3/1977 | Hoshino | 382/231 |
| 5,033,101 | A | * | 7/1991 | Sood | 382/209 |
| 5,359,677 | A | * | 10/1994 | Katsurada et al. | 382/290 |
| 5,539,841 | A | * | 7/1996 | Huttenlocher et al. | 382/218 |
| 6,014,460 | A | * | 1/2000 | Fukushima et al. | 382/177 |
| 6,327,385 | B1 | * | 12/2001 | Kamitani | 382/177 |
| 6,693,718 | B1 | * | 2/2004 | Takaoka | 358/1.15 |
| 2001/0043740 | A1 | * | 11/2001 | Ichikawa et al. | 382/176 |
| 2003/0198386 | A1 | * | 10/2003 | Luo | 382/199 |
| 2006/0187482 | A1 | * | 8/2006 | Ochiai et al. | 358/1.15 |
| 2007/0035780 | A1 | * | 2/2007 | Kanno | 358/403 |
| 2007/0214177 | A1 | * | 9/2007 | Fujiwara | 707/104.1 |

FOREIGN PATENT DOCUMENTS

JP 2001-265811 9/2001
(Continued)

OTHER PUBLICATIONS

JARS, Image Processing Conversion, 1974, JARS Chapter 10 pp. 186-207.*

*Primary Examiner* — Benny Q Tieu
*Assistant Examiner* — Ngon Nguyen
(74) *Attorney, Agent, or Firm* — Turocy & Watson, LLP

(57) ABSTRACT

In a document data management apparatus to manage document data read and digitized by an image reading apparatus, management of the document data is performed in view of the reliability of an image reading processing of the image reading apparatus, so that the reliability of various processings using the document data is improved. There are included a document data acquisition unit to acquire document data read and digitized by an image reading apparatus, a reliability determination unit to determine reliability of an image reading processing of the image reading apparatus for the document data based on the document data acquired by the document data acquisition unit, and a storage prohibition unit to prohibit, with respect to the document data for which the reliability determined by the reliability determination unit is lower than a specified threshold value, storage of the document data.

20 Claims, 15 Drawing Sheets

FOREIGN PATENT DOCUMENTS

| | | |
|---|---|---|
| JP | 2002-358481 | 12/2002 |
| JP | 2004-005551 | 1/2004 |
| JP | 2004-322081 | 11/2004 |
| JP | 2005-018678 | 1/2005 |
| JP | 2005-301793 | 10/2005 |
| JP | 2007-004319 | 1/2007 |

* cited by examiner

RECEIPT         YEAR MONTH DAY

MR. _____

PROVISO ○○

¥ ○○○○  YEN

× ×KABUSHIKI KAISHA

FIG.6

```
<xml>
    <total_score>90</total_score>
    <adressee_score>90</adressee_score>
    <>...<>
    <>...<>
    ...
</xml>
```

DOCUMENT DATA MANAGEMENT APPARATUS TO MANAGE DOCUMENT DATA READ AND DIGITIZED BY AN IMAGE READING APPARATUS AND A TECHNIQUE TO IMPROVE RELIABILITY OF VARIOUS PROCESSING USING DOCUMENT DATA

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to management of document data read and digitized by an image reading apparatus, and particularly to a technique to improve reliability of various processings using the document data.

2. Description of the Related Art

Hitherto, there is known a technique in which in order to digitize an original document such as a paper document or the like, the paper document is scanned by a scanner and is digitized.

In the technique to digitize a document as stated above, as a method of confirming whether an image (data) as desired by the user has been obtained in an image reading processing, there is known a technique in which when scanning is performed in large quantities, it is possible to relatively easily check whether all documents are in a form desired by the user (JP-A-2003-274080).

In the above related art, a scanner equipment is made to have a function to perform an area division processing, a photographic portion and a character portion of an original document are made to be capable of being recognized, and a processing is performed such that in a case where a present reading mode is different from the type of the original document, that is notified to the user to reduce errors at the time of scanning. Besides, as a variation of evaluation in the above related art, a warning is given in view of compression ratio, a histogram of color of an original document is detected and a warning is given such that what can be read in monochrome is read in color, or a scanner equipment is made to have an OCR function, it is determined whether scanned data can be read, and notice is given by electronic mail collectively.

Besides, as another related art, there is known a technique in which it is determined whether the format and content of an account book are in a specified form, and the determination result is notified through a network (JP-2005-18678).

Besides, in addition to this, there is known a technique in which a thumbnail of an digitized image is attached and the user is urged to confirm (JP-A-2000-174945), or a technique in which from a determination result, a notification is made as to what is a problem (JP-A-08-223409).

In the related art, it is determined whether scanned data is scanned as electronic data in a relatively good capture state, and the user is urged to confirm, however, in the case where the user fails to confirm, the data is simply digitized.

In the case where a business workflow to use data digitized by an image reading processing is established, there is a case where document data obtained by digitizing a paper receipt is made the original copy, and is used in an electronic approval settlement workflow.

In such a case, when document data of a document in which an obviously erroneous character string is entered, or document data in which scanning is performed in a remarkably inclined state is registered in the workflow, a problem arises in a later processing.

For example, in the case where document data obtained by digitizing a document is at such a level that it can not be used as the original copy (can not be read, is different from a regulated format, or is not a normal document), since it is denied in a processing after the business workflow without fail, the resource spent till then becomes useless. Besides, according to circumstances, unfair processing is performed based on such document data having low reliability, and there is a fear that damage is caused. In addition to this, there is also a fear that a processing mistake occurs in the workflow by the much less readable document data.

The invention has been made to solve the problems, and it is an object to provide a technique in which in a document data management apparatus to manage document data read and digitized by an image reading apparatus, management of the document data is performed in view of the reliability of an image reading processing of the image reading apparatus, so that the reliability of various processings using the document data can be improved.

DESCRIPTION OF THE DRAWINGS

FIG. 6 is a view showing an example of information embedded in document data by an associating unit 104.

DETAILED DESCRIPTION OF THE INVENTION

Hereinafter, embodiments of the invention will be described with reference to the drawings.

Throughout this description, the embodiments and examples shown should be considered as exemplars, rather than limitations on the apparatus, methods and programs of the present invention.

First Embodiment

First, a first embodiment of the invention will be described.

Figure 1:
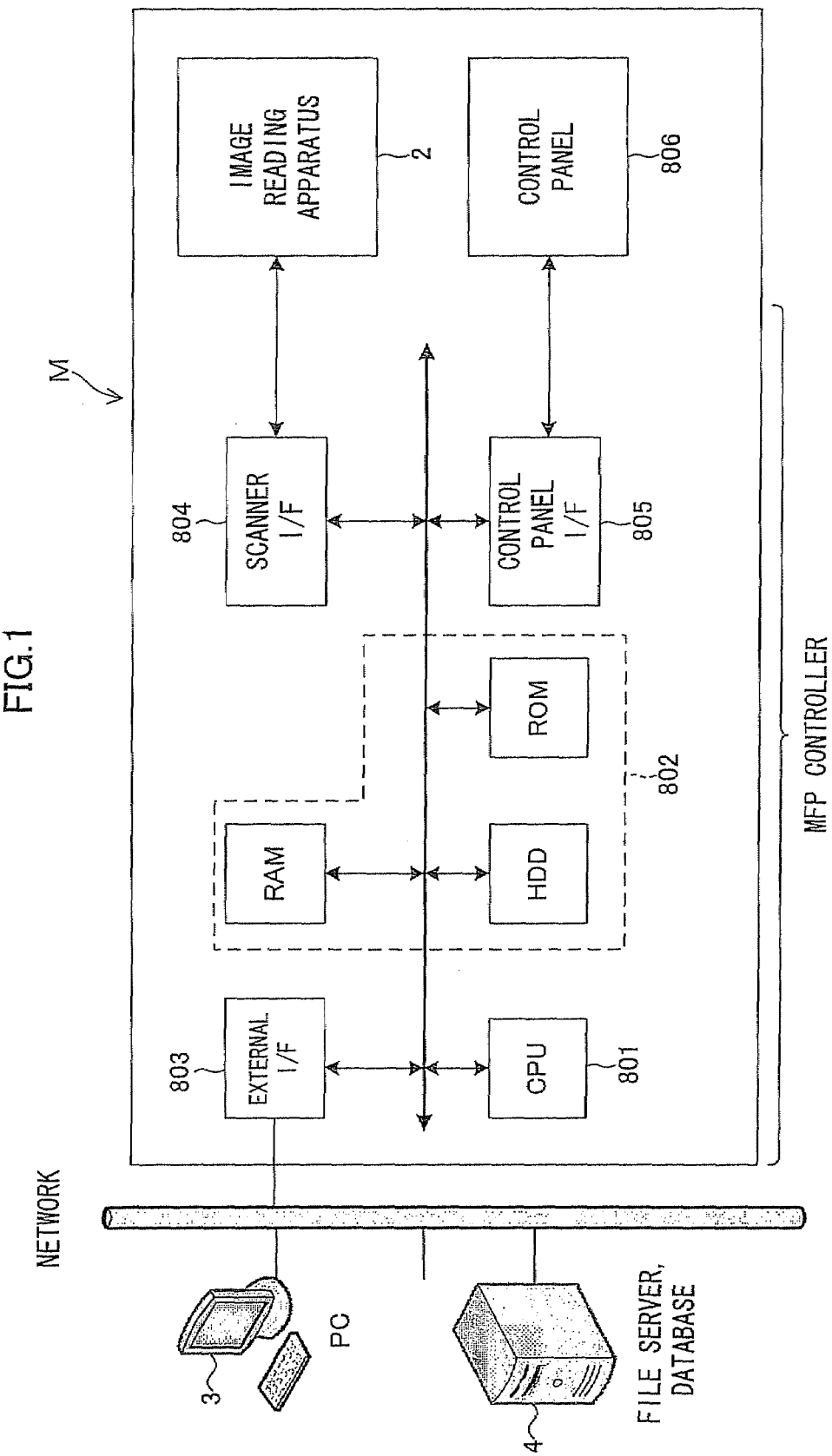
FIG. 1 is a system structural view for explaining an image processing apparatus M including a document data management apparatus according to a first embodiment of the invention.

FIG. 1 is a system structural view for explaining an image processing apparatus M including a document data management apparatus according to the first embodiment of the invention. An image reading apparatus (scanner) 2 is connected to an MFP controller through a scanner I/F 804. Document data of an original document scanned by the image reading apparatus 2 is stored in a HDD, a memory or an image file server 4 on a network. A program loaded into a memory from the HDD, ROM or the like is executed by a CPU, so that an OCR analysis or the like of a scanned image is executed. The data analyzed and processed in this way is stored in the HDD or the like in the image processing apparatus M or is discarded according to the analysis result. As the storage area of the analysis result and the like here, in addition to the HDD in the image processing apparatus M, a PC 3, the image file server 4, a database or the like as an external equipment can be adopted through an external I/F 803.

Besides, the image processing apparatus M according to this embodiment has a processing mode for an electronic workflow. This processing mode is the mode to regulate the flow of a processing flow at the time when a document is scanned and digitized. For example, it is possible to perform setting as to whether or not a function to check whether scanning has been performed at a resolution of 300 dpi or more and finely is made effective.

Figure 2:
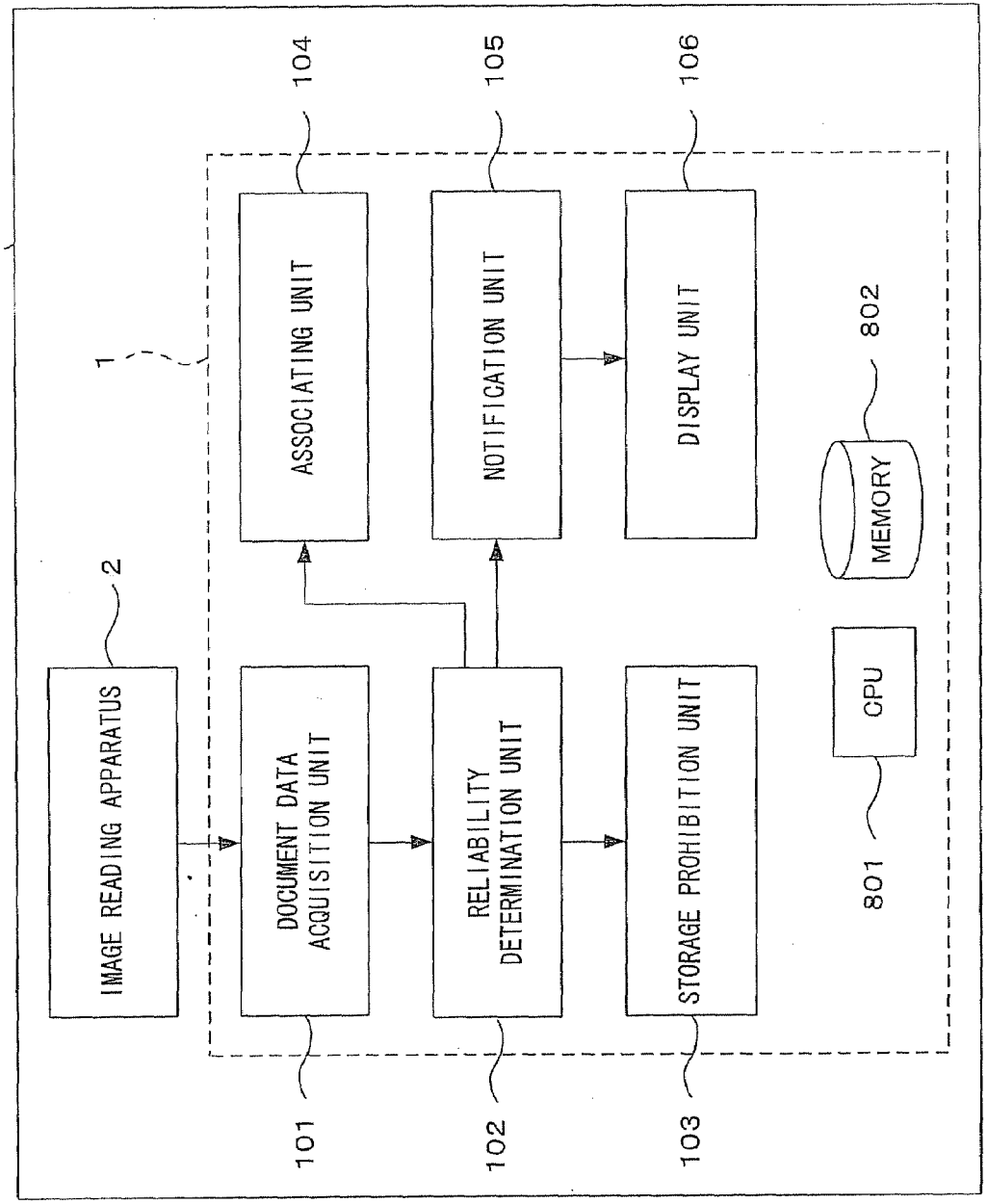
FIG. 2 is a functional block diagram for explaining the document data management apparatus according to the embodiment and the image processing apparatus M including the same.

FIG. 2 is a functional block diagram for explaining the document data management apparatus according to the embodiment and the image processing apparatus M including the same. The image processing apparatus (MFP: Multi Function Peripheral) M according to the embodiment includes the image reading apparatus 2 and a document data management apparatus 1. The document data management apparatus 1 of the embodiment includes a document data acquisition unit 101, a reliability determination unit 102, a storage prohibition unit 103, an associating unit 104, a notification unit 105, a display unit 106, a CPU 801 and a MEMORY 802.

The image reading apparatus 2 optically reads an image of a read object surface of an original document automatically transported by an ADF (Auto Document Feeder) or of an original document placed on an original document stand, and creates document data based on the image. The document data here has a general data format such as, for example, PDF (Portable Document Format), XPSDoc (XML Paper Specification Document), JPEG, JPEC2000, TIFF or PNG, and arbitrary metadata can be registered.

The document data acquisition unit 101 has a function to acquire document data read and digitized by the image reading apparatus 2.

The reliability determination unit 102 has a function to perform a layout analysis on the document data acquired by the document data acquisition unit 102 and to determine the reliability of an image reading processing of the image reading apparatus 2 for each object based on the object extracted by the layout analysis and a specified object.

Besides, the reliability determination unit 102 performs the layout analysis on the document data acquired by the document data acquisition unit 101, and determines the reliability of the image reading processing of the image reading apparatus 2 based on a coincidence rate between a character string of the objected extracted by the layout analysis and a specified character string corresponding to the object.

Of course, the determination of the reliability by the reliability determination unit 102 may be performed not only for each object included in the document data but also for the whole document data totally.

The storage prohibition unit 103 has a function to prohibit document data for which the reliability determined by the reliability determination unit 102 is lower than a specified threshold value from being stored into a specified storage area of the document data or from being registered into a specific workflow system.

The associating unit 104 has a function to associate, in a case where the reliability determined by the reliability determination unit 102 is higher than the specified threshold value, the document data acquired by the document data acquisition unit 101 with the reliability determined by the reliability determination unit 102 for the document data and to store them in a specified storage area. Specifically, the associating unit 104 associates information indicating the reliability determined by the reliability determination unit 102 for each object with the object in the document data acquired by the document data acquisition unit 101 and embeds them into the document data. Incidentally, the information indicating the reliability is, for example, metadata indicating an evaluation value of the reliability, and the embedding of the information indicating the reliability into the document data means that the metadata is added as the metadata to the objective document data.

Incidentally, in order to associate each object in the document data with the information indicating the reliability of the image reading processing, it is not always necessary to perform the processing of embedding the information indicating the reliability into the document data, and for example, the information indicating the reliability of the image reading processing and associated with each object in the document data may be stored in a storage area, such as the MEMORY 802, separately from the document data (that is, the correspondence relation between the object in the document data and the reliability has only to be confirmed).

The notification unit 105 has a function to notify, in a case where the reliability determined by the reliability determination unit 102 is lower than the specified threshold value, that the reliability of the image reading processing of the image reading apparatus 2 is low with respect to the document data for which the reliability is determined.

The display unit 106 includes, for example, a liquid crystal display, and has a function to screen-display information relating to processing content in the image processing apparatus M and the document data management apparatus 1.

The CPU 801 has a function to perform various processings in the image processing apparatus M and the document data management apparatus 1, and has a function to realize various functions by executing programs stored in the MEMORY 802. The MEMORY 802 includes, for example, a ROM or a RAM, and has a function to store various information and programs used in the image processing apparatus M and the document data management apparatus 1.

Figure 3:
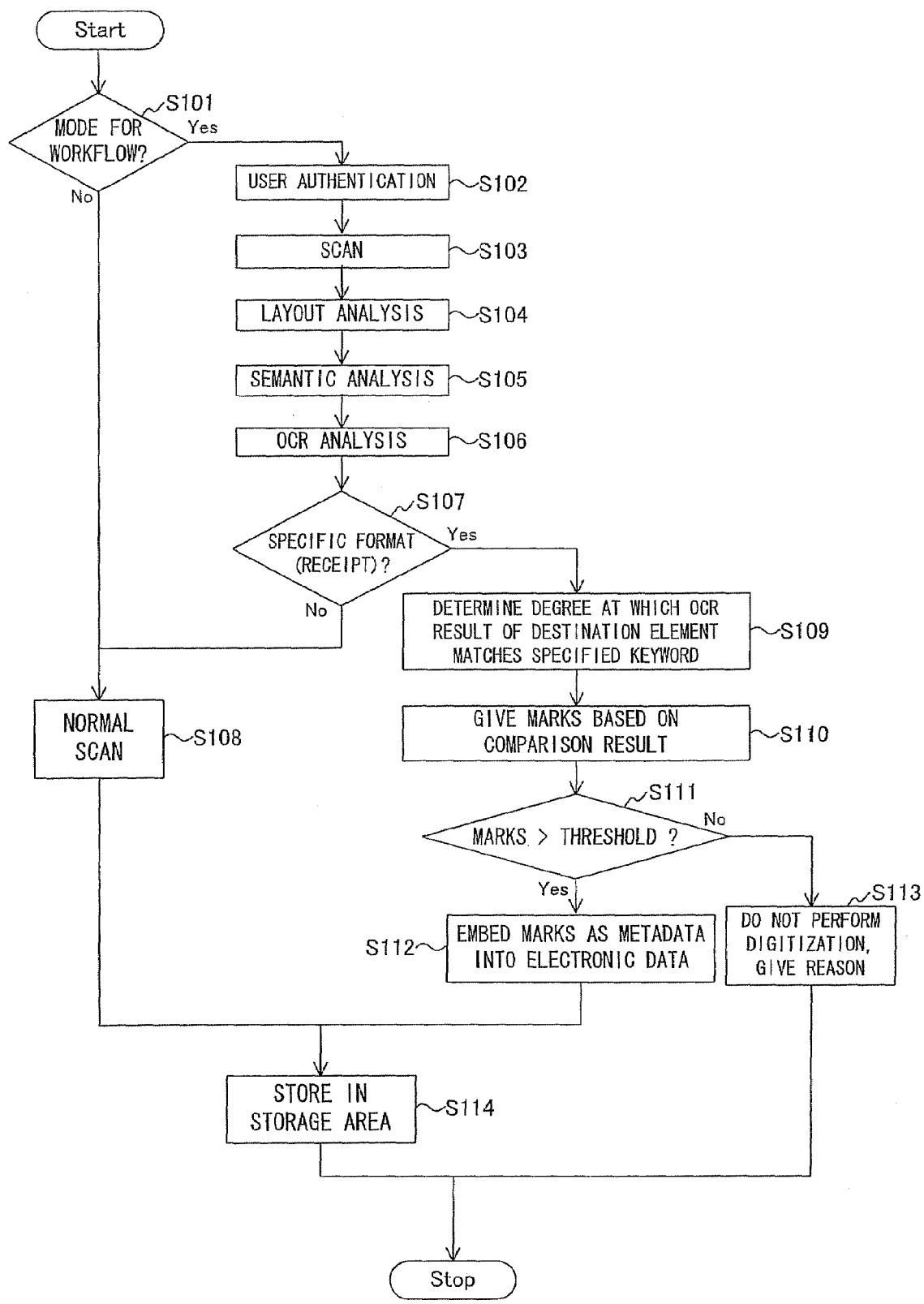
FIG. 3 is a flowchart for explaining the details of a processing in a document data management apparatus 1 according to the embodiment.

FIG. 3 is a flowchart for explaining the details of a processing in the document data management apparatus 1 according to this embodiment.

In this embodiment, it is assumed that an original document to be scanned by the image reading apparatus 2 is a receipt. Of course, the original document which can be applied to this embodiment is not limited to the receipt, and it is needless to say that a similar processing can be performed also in a format for a specific use. As the format for the specific use here, the format of, for example, a purchase order, a statement of delivery, a debit note, or an application form for business use can be mentioned.

First, the image processing apparatus M checks a processing mode (S101), and in the case where reliability is required for a reading processing of a read original document (in the case where the mode is for a workflow) (S101, Yes), and performs user authentication (S102). When the user is authenticated, the reliability determination unit 102 performs a layout analysis (S104), a semantic analysis (S105), and an OCR analysis (S106) on the scanned (S103) data, and determines whether the content of the scanned image is in a specific format (S107).

Figures 4, 5:
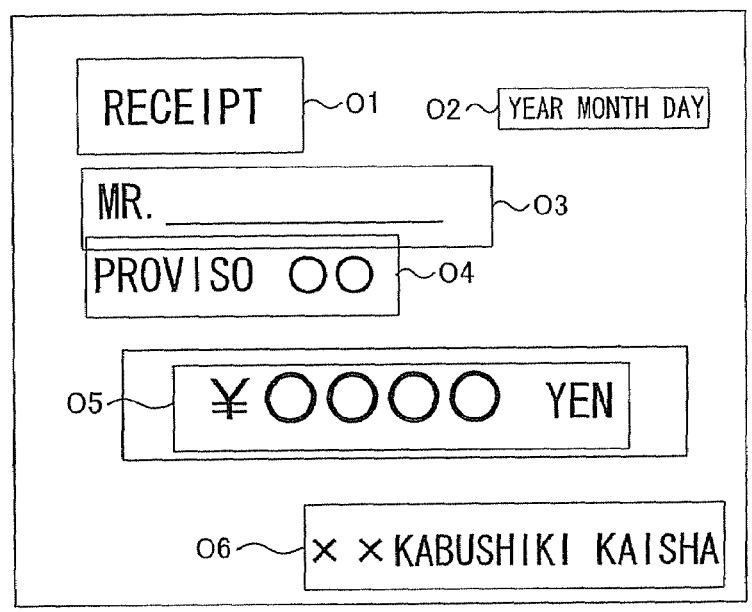
FIG. 4 is a view for explaining a format of a receipt.
FIG. 5 is a view showing an example of layout information in a case where a layout analysis is performed on an image of the receipt.

Here, it is assumed that the format has been like a receipt (see FIG. 4). In general, the character of "receipt", date of issuance, destination, proviso, sum of money, address and telephone number of issuing source, and the like are entered on the receipt. When scanning is performed in the mode for the workflow in the image processing apparatus M, the reliability determination unit 102 determines whether the format is already registered (S107). As a determination method, first, the layout analysis is performed on the scanned image by the reliability determination unit 102 (S104), and elements in the image are decomposed. FIG. 5 shows an example of layout information of the case where the layout analysis is performed on the image of the receipt shown in FIG. 4. In the example shown in FIG. 5, six objects of objects O1 to O6 are extracted. Next, the reliability determination unit 102 performs a semantic analysis in each block to determine whether it is in a specific format (S105). The semantic analysis here is performed such that for example, since the character of "receipt" is placed at the upper part of the image and the size of the typeface is large, it is "Title". Next, the reliability determination unit 102 performs an OCR processing on the area (S106), and estimates, based on the result of the OCR processing, whether it is a previously registered keyword (word registered in a dictionary or the like). Besides, the estimation of the receipt format can be performed based on a keyword such as "destination" or "proviso".

In this embodiment, it is determined that the document data is obtained from the "receipt" (S107, Yes), and at the same time, the result of the OCR processing is stored in the MEMORY 802, and information obtained by converting the OCR result into numbers (information indicating the reliability of the scan processing) is embedded as metadata into the scanned data by the associating unit 104 (S112).

FIG. 6 is a view showing an example of information embedded in the document data by the associating unit 104. With respect to the conversion of the OCR result into numbers, in the processing of the business flow, there is a case where the destination must be fixed. For example, there is such a rule that the destination must always be in the form of "OO Kabushiki Kaisha", and the destination of a form such as "OO Kaisha (Kab)" can not be approved on the business flow. This rule is previously registered in the image processing apparatus M, the database or the like, this rule and the result of the OCR analysis are determined (S109), and a numerical value is calculated according to the number of matched characters (S110). A case where matching of 100% is obtained is made full marks of 100 points and marks may be given, or an expression using a ratio may be adopted, and some index is imbedded as metadata into the created electronic data. Here, the user information acquired when the user authentication is performed at S102 is also added to the electronic file.

Figure 7:
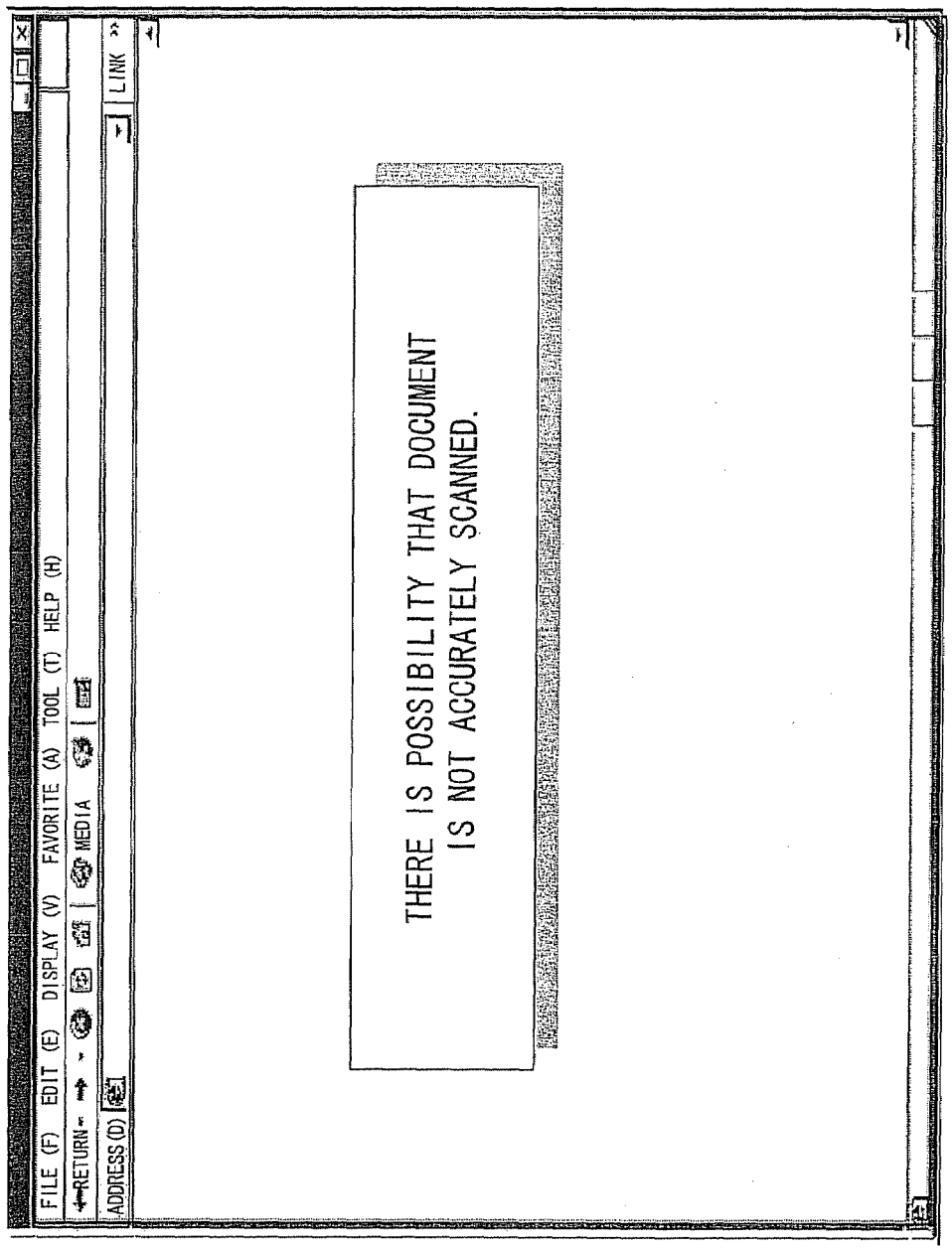
FIG. 7 is a view showing an example of a screen display on a display unit 106.

Thereafter, the reliability determination unit 102 compares a previously set threshold value with the evaluation value (information indicating the reliability), and for example, when it is lower than 60 points (S111, No), a screen display as shown in FIG. 7 is performed by the display unit 106, and the storage of the document data is forcibly stopped (S113).

On the other hand, in the case where the evaluation value of the scan processing is the threshold value or higher (S111, Yes), the evaluation value is embedded as the metadata into the document data, and is stored in a specified storage area such as the MEMORY 802 (S114).

In the case where it is determined that the document data is not what is obtained by scanning the original document of the specific format (S107, No), the data of the read image is stored in a specified storage area as a normal scan processing (S108).

Although the OCR processing does not guarantee the accuracy of 100%, according to the structure as stated above, it is possible to prevent data which ought not to be originally approved in the electronic workflow from flowing.

Second Embodiment

Next, a second embodiment of the invention will be described.

This embodiment is a modified example of the first embodiment, and its basic apparatus structure is the same as that of the first embodiment. This embodiment is different from the first embodiment in a part of a flow of its processing.

Figure 8:
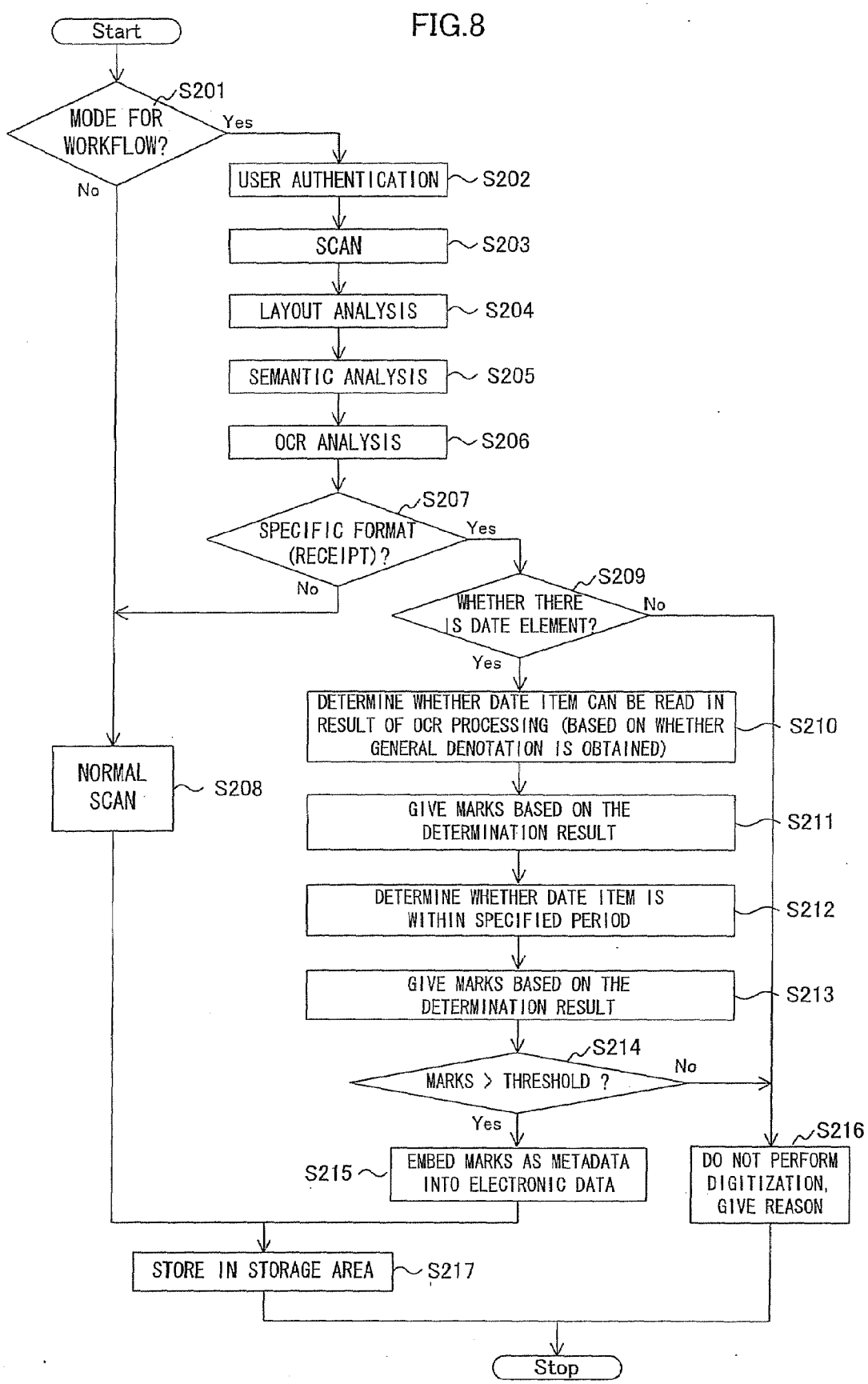
FIG. 8 is a flowchart showing a flow of a processing in a document data management apparatus according to a second embodiment of the invention.

FIG. 8 is a flowchart showing the flow of the processing in a document data management apparatus according to the second embodiment of the invention. Incidentally, in the flowchart shown in the drawing, since S201 to S208, and S214 to S217 are similar processings to S101 to S108, and S111 to S114 in FIG. 3, their description will be omitted.

In this embodiment, the analysis processing performed in the first embodiment is enabled to be performed also on another component in document data. When a receipt is used as an example, it is determined whether a date is entered (S209), and marks are given. When the date exists (S209, Yes), and it can be determined to be the date in the OCR result (S210), reference is made to past determination results, and a relatively high score is added. When it can not be determined to be the date in the OCR result, an evaluation score is given according to the result (S211).

In addition, it is also determined whether the recognized date is an abnormally old date relative to the present date (S212). In this case, it is determined whether the document is within a reception period regulated by the business flow, and in the case where it is not within the period, a low score is added (S213). By performing the determination as stated above, a useless labor in a later processing can be reduced.

Third Embodiment

Next, a third embodiment of the invention will be described.

This embodiment is a modified example of the first embodiment, and its basic apparatus structure is the same as that of the first embodiment. This embodiment is different from the first embodiment in a part of a flow of its processing.

Figure 9:
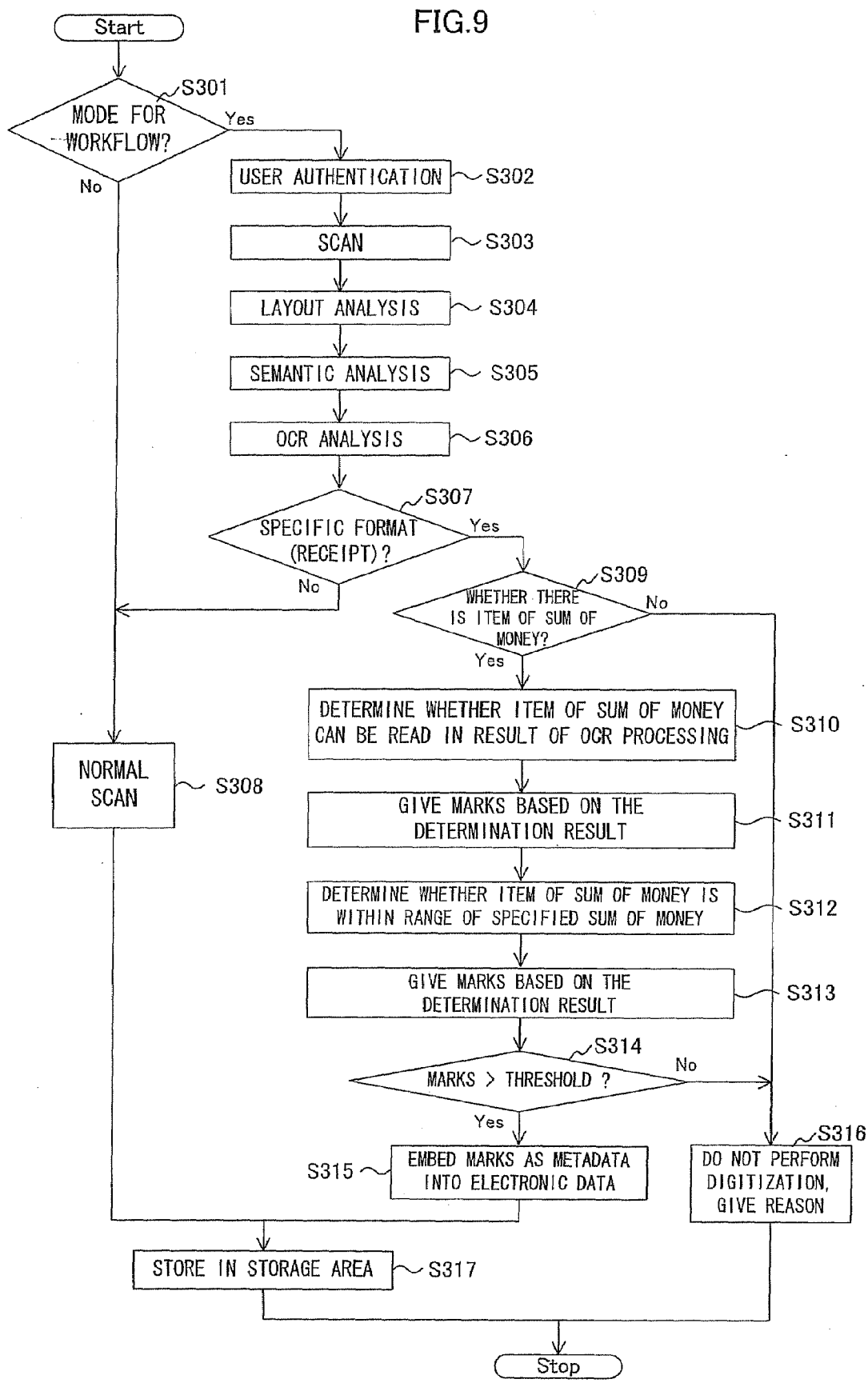
FIG. 9 is a flowchart showing a flow of a processing in a document data management apparatus according to a third embodiment of the invention.

FIG. 9 is a flowchart showing the flow of the processing in a document data management apparatus according to the third embodiment of the invention. Incidentally, in the flowchart shown in the drawing, since S301 to S308, and S314 to S317 are similar processings to S101 to S108, and S111 to S114 in FIG. 3, their description will be omitted.

For example, in the case where there is a rule that unless the receipt is for less than 30000 yen, it can not be processed in the electronic workflow, a layout analysis and a semantic analysis processings are performed by the reliability determination unit 102, data estimated to be a character string of a sum of money (S309, S310) is compared with a previously determined keyword, and an evaluation score is calculated (S311). Besides, it is determined whether the item of the sum of money is the sum of money within the range of a specified sum of money (S312), and in the case where the item is not within the range of the specified sum of money, it is denied that the receipt is digitized and is made to flow to the electronic workflow, while when the item is within the range of the specified sum of money, an evaluation score is added. By adopting the structure as stated above, a processing load on the business flow can be reduced, and there are obtained effects such as saving of resources.

Fourth Embodiment

Next, a fourth embodiment of the invention will be described.

This embodiment is a modified example of the first embodiment, and its basic apparatus structure is the same as that of the first embodiment. This embodiment is different from the first embodiment in a part of a flow of its processing.

Figure 10:
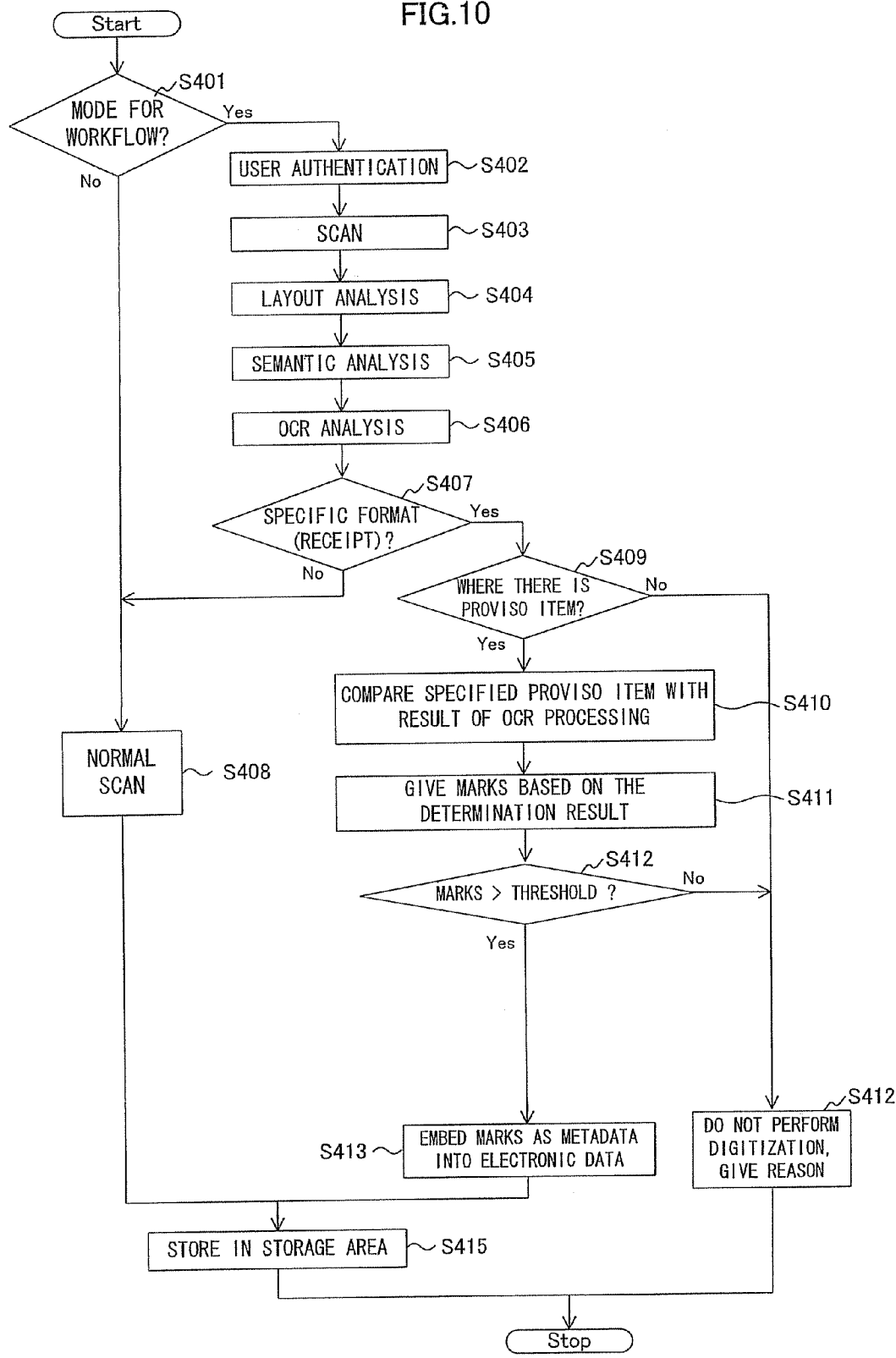
FIG. 10 is a flowchart showing a flow of a processing in a document data management apparatus according to a fourth embodiment of the invention.

FIG. 10 is a flowchart showing the flow of the processing in a document data management apparatus according to the fourth embodiment of the invention. Incidentally, in the flowchart shown in the drawing, since S401 to S408, and S412 to S415 are similar processings to S101 to S108, and S111 to S114 in FIG. 3, their description will be omitted.

In the case where a receipt is processed on a business workflow, there is a case where unless the "proviso" is entered in a specified form, it is not approved. In general, "article cost" or "cost for article" is not approved, and specific content must be entered. In this embodiment, a method of checking the state of the proviso as an object to which marks are given will be described.

Data estimated to be a character string of "proviso" (S409, Yes) by the layout analysis and the semantic analysis processings is compared with a previously determined keyword (here, a keyword, such as "book cost" or "lodging expense", not an abstract one such as "article cost") (S410), and marks are calculated from the result of character string matching (S411).

By adopting the structure as stated above, a reduction in processing load on the business flow can be realized, and there are obtained effects such as saving of resources.

Fifth Embodiment

Next, a fifth embodiment of the invention will be described.

This embodiment is a modified example of the first embodiment, and its basic apparatus structure is the same as that of the first embodiment. This embodiment is different from the first embodiment in a part of a flow of its processing.

Figure 11:
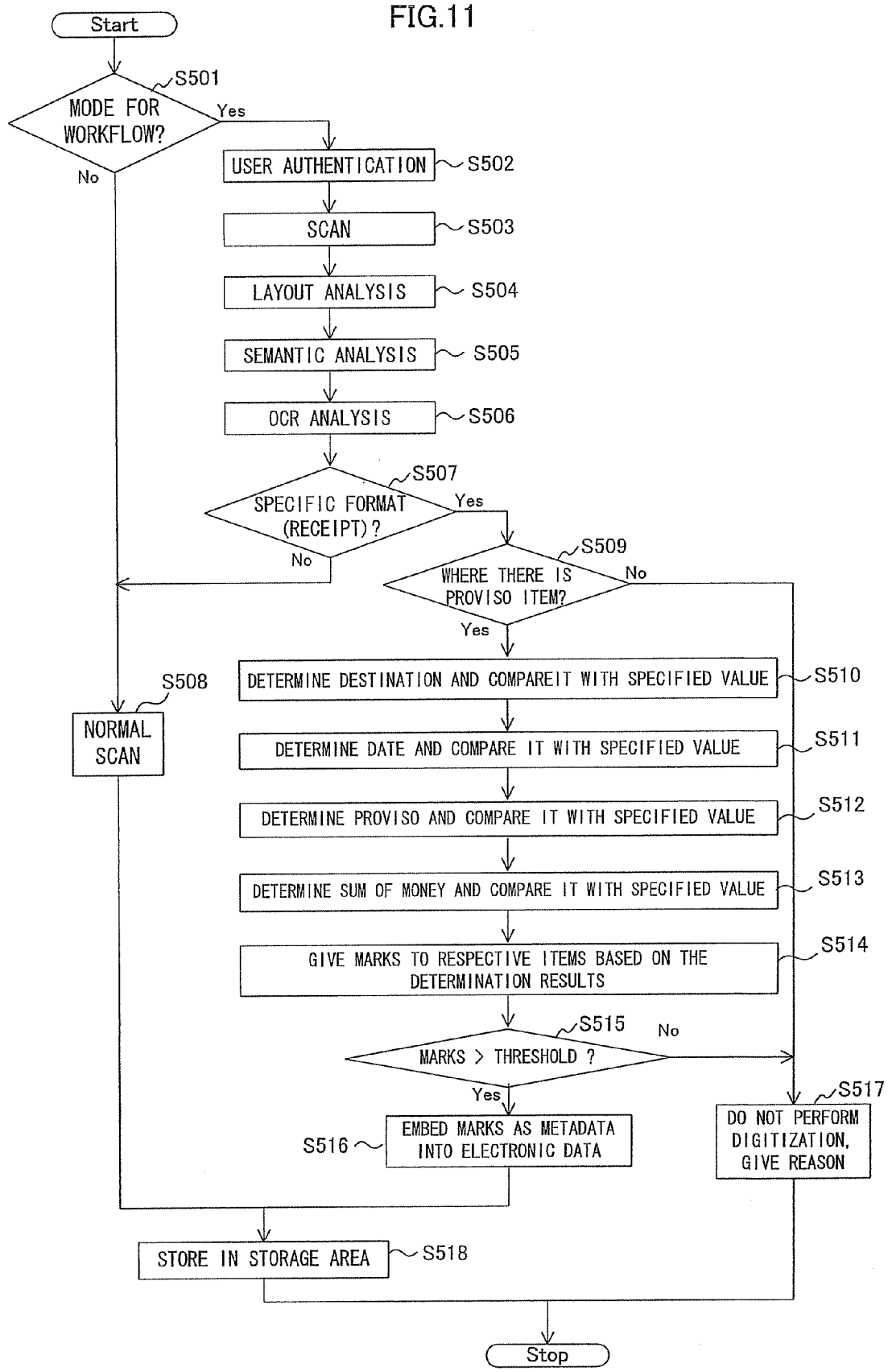
FIG. 11 is a flowchart showing a flow of a processing in a document data management apparatus according to a fifth embodiment of the invention.

FIG. 11 is a flowchart showing the flow of the processing in a document data management apparatus according to the fifth embodiment of the invention. Incidentally, in the flowchart shown in the drawing, since S501 to S508, and S515 to S518 are similar processings to S101 to S108, and S111 to S114 in FIG. 3, their description will be omitted.

The giving of marks in the processing of this embodiment may be performed for each item extracted by the layout analysis, or weighting data is set for each item, and a numerical value obtained by multiplying an evaluation score by a weighting value of each item may be made the final marks.

In document data determined to have the character string of "proviso" by the layout analysis and the semantic analysis processings (S509, Yes), "destination" (S510), "date" (S511), "proviso" (S512) and "sum of money" (S513) are compared with specified data, and based on the comparison results, an evaluation score of each of the items of "destination", "date", "proviso" and "sum of money" is calculated (S514).

In this embodiment, the final evaluation score is embedded as metadata into the document data, and the scores of each item and the content of each item are simultaneously embedded.

Incidentally, in this embodiment, although the receipt is used as the example, in addition to the receipt, a structure may be such that as to whether necessary items are entered in accordance with specifications of a specific format, comparison with master data is performed and marks are given (conversion into numbers).

For example, in a purchase order, keywords such as "name", "number", "unit price", "total sum of money", "order destination", and "date of delivery" become important, and in the case where document data scanned from a paper document is used in an electronic ordering business workflow, evaluation scores based on such keywords become useful.

As stated above, the reliability determination unit 102 of the document data management apparatus according to this embodiment has such a structure that the layout analysis is performed on the document data acquired by the document data acquisition unit 101, and the reliability of the image reading processing of the image reading apparatus 2 is determined based on the character string of the object extracted by the layout analysis, and the specified format corresponding to the kind of the object (for example, based on the degree as to whether the character string of the OCR result can be recognized to be in the regular format such as the date or sum of money).

Sixth Embodiment

Next, a sixth embodiment of the invention will be described.

This embodiment is a modified example of the first embodiment, and its basic apparatus structure is the same as that of the first embodiment. This embodiment is different from the first embodiment in a part of a flow of its processing.

Figure 12:
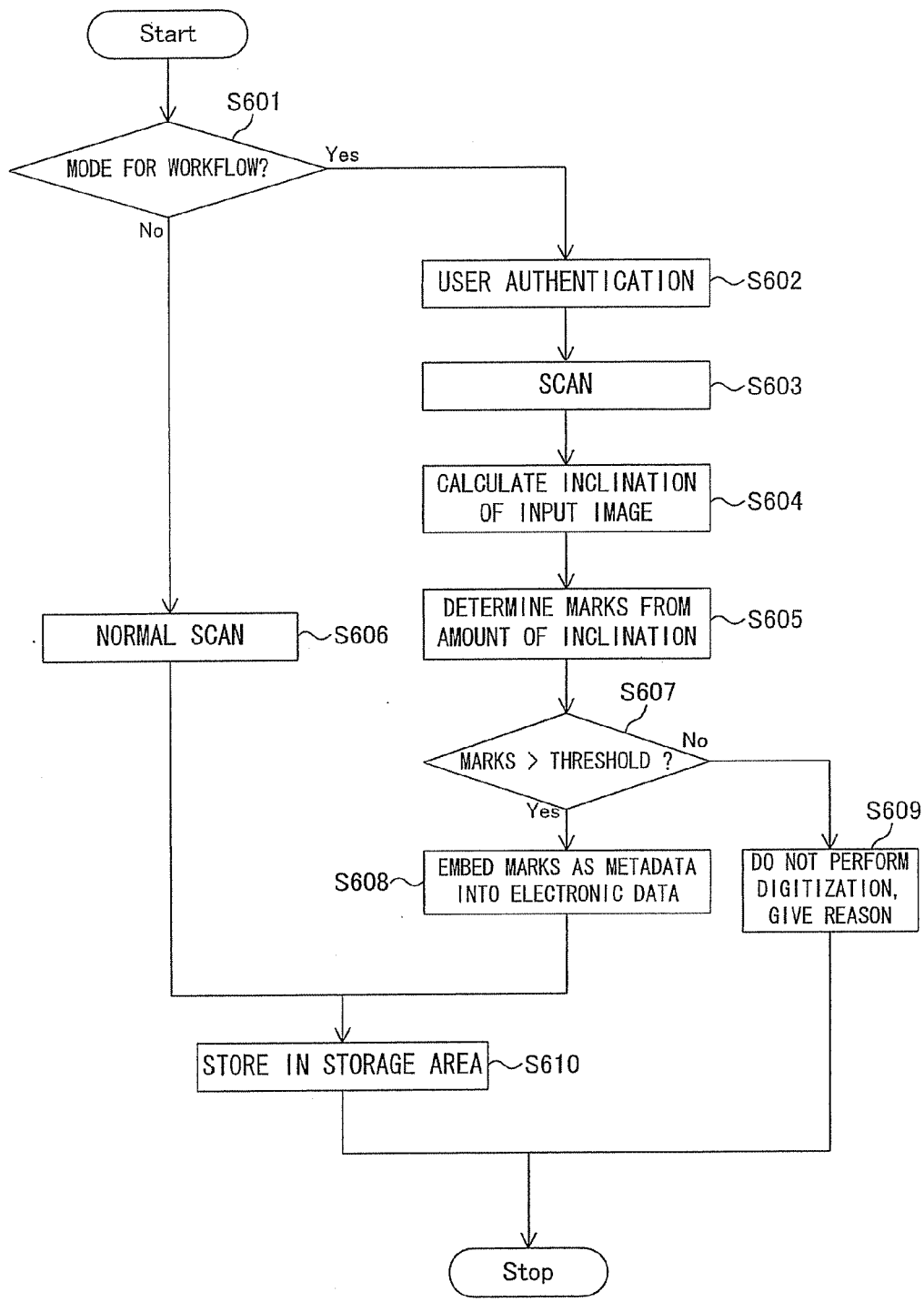
FIG. 12 is a flowchart showing a flow of a processing in a document data management apparatus according to a sixth embodiment of the invention.

FIG. 12 is a flowchart showing the flow of the processing in a document data management apparatus of the sixth embodiment. Incidentally, in the flowchart shown in the drawing, since S601 to S603, S606, and S607 to S610 are similar processings to S101 to S103, S108, and S111 to S114 in FIG. 3, their description will be omitted.

In this embodiment, with respect to the calculation of an evaluation score by the reliability determination unit 102, the determination is performed based on not only the matching of character information, but also the quality of an input image, and marks are given.

In the case where scanning is performed (S603) in a "mode for workflow" (S601, Yes), the reliability determination unit 102 in this embodiment calculates the inclination of document data (inclination of an object in document data) (S604).

Figure 13:
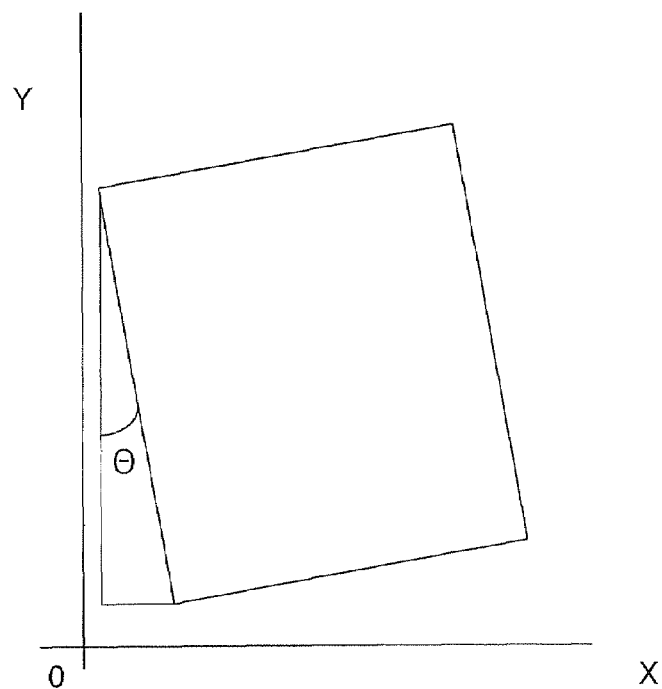
FIG. 13 is a view showing an example of document data in which an object or the whole document data is inclined.
Figure 14:
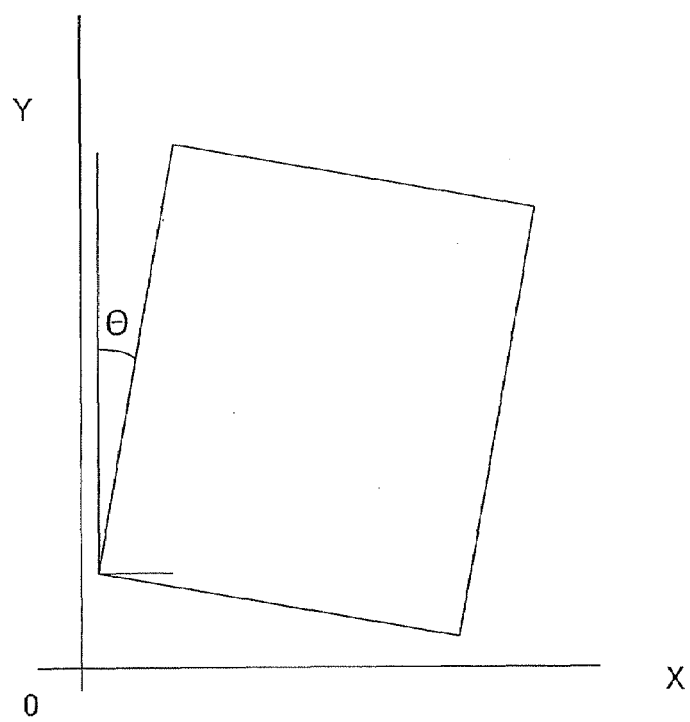
FIG. 14 is a view showing an example of document data in which an object or the whole document data is inclined.

As a calculation method, when a print character string is processed by an OCR function, a general character is extracted, and the inclination of an input image can be calculated based on the degree of the inclination of the character. Alternatively, the inclination of an original document is calculated when the paper size is confirmed at the time of reading. The giving of marks is performed based on the degree of the inclination (S605). For example, when the Y axis is made the reference, when the inclination between the end of an upper part and the end of a lower part is close to 0 degree, the scores are made "100 points". FIG. 13 and FIG. 14 show examples of document data in which an object or the whole document data is inclined by an angle θ with respect to the Y axis.

By combining the processing in this embodiment with the processing in the respective embodiments, a useless processing on the workflow is omitted, and a high accuracy analysis can be performed when a later analysis (layout analysis, OCR analysis) is performed.

Besides, when a similar determination is performed on not only the inclination of document data, but also a position shift of the whole document data, a higher accuracy analysis processing can be realized.

As stated above, the reliability determination unit 102 in this embodiment has the function to perform the layout analysis on the document data acquired by the document data acquisition unit 101 and to determine the reliability of the image reading processing of the image reading apparatus 2 based on the amount of the shift of the position, on the image, of the object extracted by the layout analysis from the specified arrangement position corresponding to the object.

Seventh Embodiment

Next, a seventh embodiment of the invention will be described.

This embodiment is a modified example of the first embodiment, and its basic apparatus structure is the same as that of the first embodiment. This embodiment is different from the first embodiment in a part of a flow of its processing.

Figure 15:
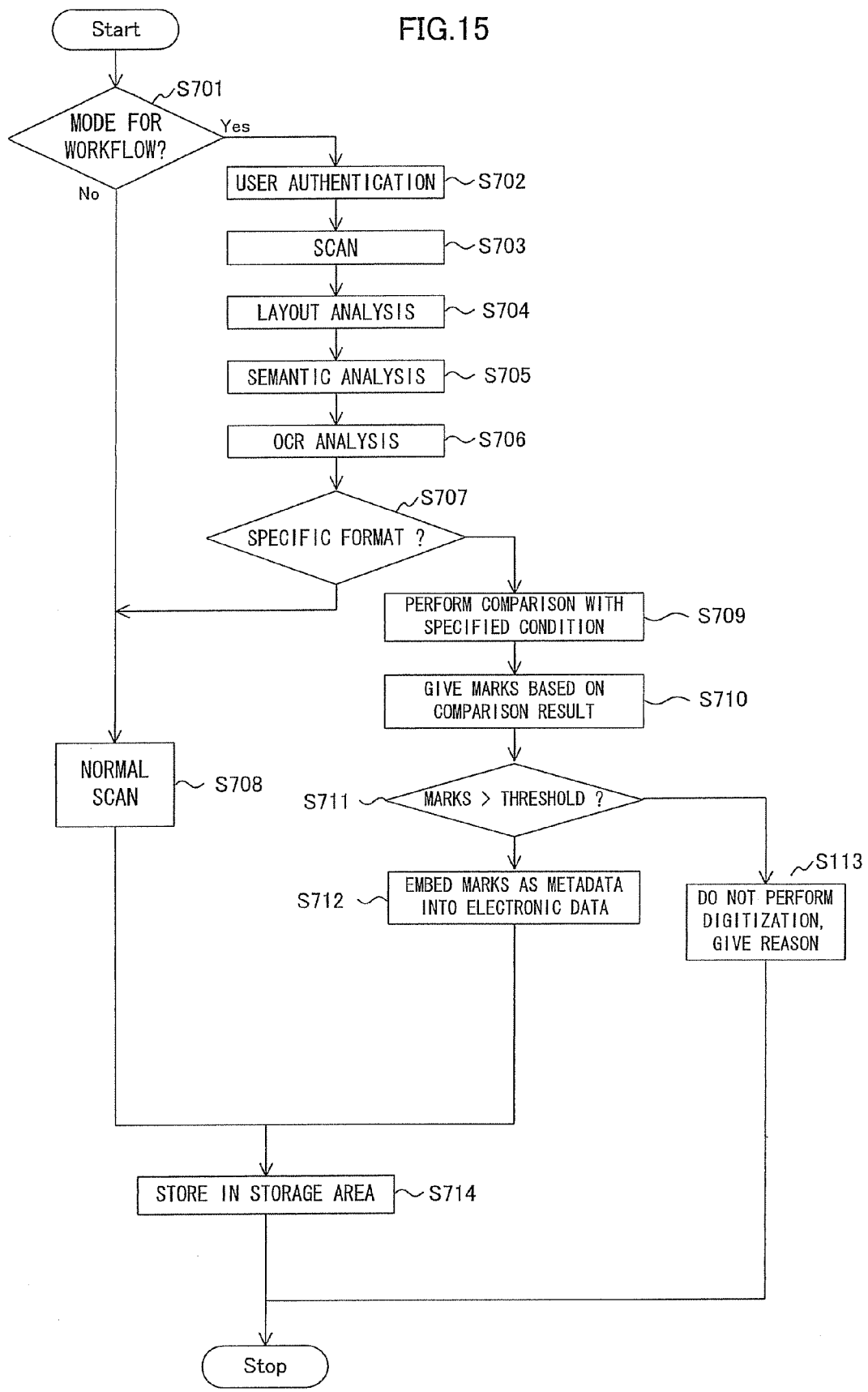
FIG. 15 is a flowchart showing a flow of a processing in a document data management apparatus according to a seventh embodiment of the invention.

FIG. 15 is a flowchart showing the flow of the processing in a document data management apparatus of the seventh embodiment. Incidentally, in the flowchart shown in the drawing, since S701 to S713 are similar processings to S101 to S113 in FIG. 3, their description will be omitted.

In the foregoing respective embodiments, although the structure is such that the marks (evaluation data) are embedded in the specified storage area or the document data itself and are stored, in this embodiment, created electronic data is not stored in a storage area, but is directly registered in a workflow system by using, for example, Webservice or the like (S714).

Eighth Embodiment

Next, an eighth embodiment of the invention will be described.

This embodiment is a modified example of the first embodiment, and its basic apparatus structure is the same as that of the first embodiment. This embodiment is different from the first embodiment in a part of a flow of its processing.

Figure 16:
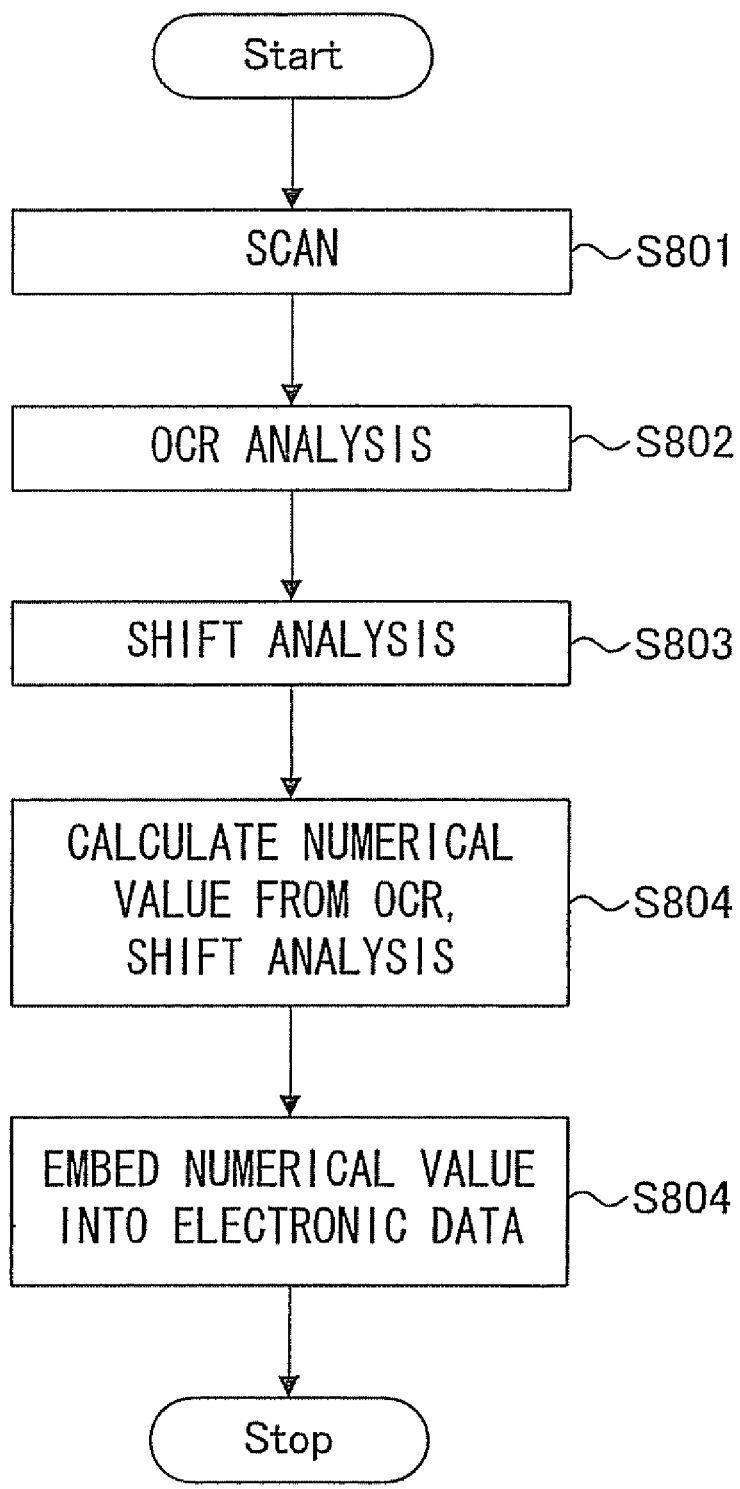
FIG. 16 is a flowchart showing a flow of a processing in a document data management apparatus according to an eighth embodiment of the invention.

FIG. 16 is a flowchart showing the flow of the processing in a document data management apparatus according to the eighth embodiment of the invention.

The document data management apparatus according to this embodiment performs an OCR analysis (S802) also with respect to a scan processing (S801) of a general document, in addition to a workflow (condition is such that document data based on high reliability scan processing is required), and adds the determination result as metadata to the electronic data.

Besides, a shift of an image is calculated by the OCR processing or the reading apparatus (S803), and marks are given also by the amount of the shift (S804) and are added as metadata to the document data (S805).

According to this embodiment, when scanned document data are retrieved, retrieval can be performed for ones having excellent OCR results, or ones finely scanned, and convenience in managing the document data can be improved.

Figure 17:
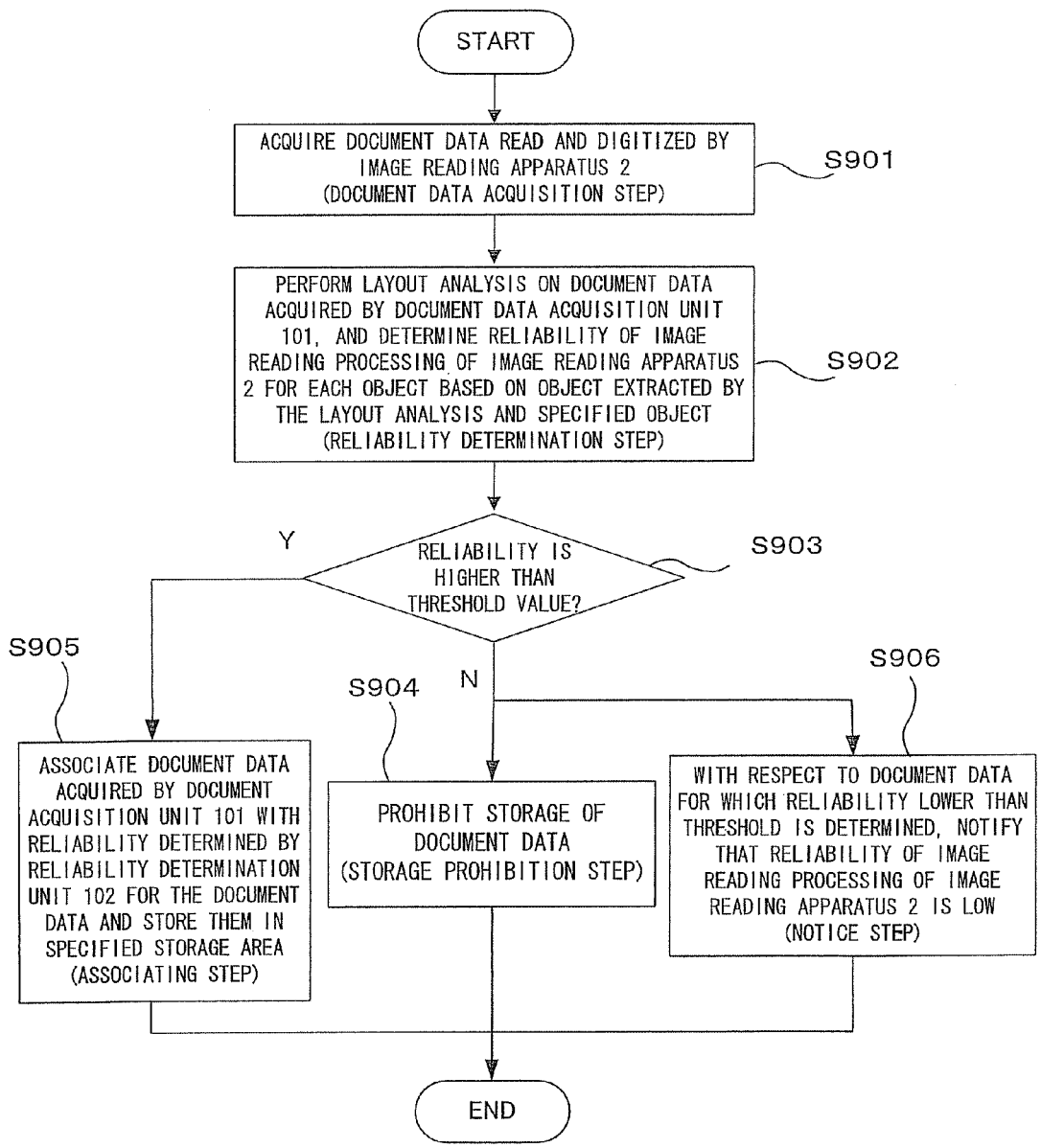
FIG. 17 is a flowchart for explaining a flow of a rough processing (document data management method) in the document data management apparatus according to the embodiment.

FIG. 17 is a flowchart for explaining a flow of a rough processing (document data management method) in a document data management apparatus according to an embodiment.

First, the document data acquisition unit 101 acquires document data of an image read by the image reading apparatus 2 (document data acquisition step) (S901).

Next, the reliability determination unit 102 performs the layout analysis on the document data acquired by the document data acquisition unit 101, and determines the reliability of the image reading processing of the image reading apparatus 2 for each object based on the object extracted by the layout analysis and a specified object (reliability determination step) (S902).

Specifically, the reliability determination unit 102 has the function to perform the layout analysis on the document data acquired by the document data acquisition unit 101, and to determine the reliability of the image reading processing of the image reading apparatus 2 based on a coincidence rate between a character string of the object extracted by the layout analysis and a specified character string corresponding to the object.

The reliability determination unit 102 has the function to perform the layout analysis on the document data acquired by the document data acquisition unit 101, and to determine the reliability of the image reading processing of the image reading apparatus 2 based on the character string of the object extracted by the layout analysis and a specified format corresponding to the kind of the object.

Besides, the reliability determination unit 102 performs the layout analysis on the document data acquired by the document data acquisition unit 101, and can also determine the reliability of the image reading processing of the image reading apparatus 2 based on the amount of shift of the position, on the image, of the object extracted by the layout analysis from a specified arrangement position corresponding to the object. Here, the reliability determination unit 102 performs the layout analysis on the document data acquired by the document data acquisition unit 101, and may determine the reliability of the image reading processing of the image reading apparatus 2 based on the inclination angle of the character string of the object extracted by the layout analysis.

Of course, the determination of the reliability by the reliability determination unit 102 may be performed not only for each object included in the document data, but also for the overall content of the document data totally.

Next, with respect to document data for which the reliability determined by the reliability determination unit 102 is lower than the specified threshold value (S903, No), the storage prohibition unit 103 prohibits storage of the document data (storage prohibition step) (S904).

In the case where the reliability determined by the reliability determination unit 102 is higher than the specified threshold value (S903, Yes), the associating unit 104 associates the document data acquired by the document data acquisition unit 101 with the reliability determined for the document data by the reliability determination unit 102 and stores them in the specified storage area (associating step) (S905).

Here, the associating unit 104 is structured to associate the reliability determined for each object by the reliability determination unit 102 with each object in the document data acquired by the document data acquisition unit 101 and to embed them into the document data.

In the case where the reliability determined by the reliability determination unit 102 is lower than the specified threshold value (S903, No), the notification unit 105 notifies that with respect to the document data for which the reliability is determined, the reliability of the image reading processing of the image reading apparatus 2 is low (notification step) (S906).

The respective steps in the processing of the document data management apparatus are realized by causing the CPU 801 to execute a document data management program stored in MEMORY 802.

In the embodiment, although the description has been made on the case where the function to carry out the invention is previously recorded in the inside of the apparatus, no limitation is made to this, and a similar function may be downloaded from a network to the apparatus, or a similar function recorded on a recording medium may be installed in the apparatus. As the recording medium, any form may be adopted as long as the recording medium, such as a CD-ROM, can store the program and can be read by the apparatus. Besides, the function obtained by the previous installation or download may realize the function in cooperation with an OS (Operating System) of the inside of the apparatus.

As stated above, in the respective embodiments, it is determined at the time of scanning whether the paper document is in a specific format, or the scanned data is in a desired form, and according to the determination result, digitization can be denied by the apparatus based on the setting of the user. Incidentally, even in the case where the digitization is performed, the degree (marks) of the reliability can be directly added as a numerical value to the electronic data so that also in a later processing, an automatic or later confirmation can be performed as to whether the data lacks reliability or to what degree the data can be relied.

In the related art method, only a result is understood via a medium such as mail, however, the user must further find out data as an object and this is troublesome. In the invention, also with respect to a general scan document, an index indicating whether capture is performed accurately and at the readable level is added as the metadata to the scanned document data, so that data with high or low reliability can be directly found by metadata retrieval.

Incidentally, in the foregoing embodiments, although the example has been described in which the document data management apparatus 1 is disposed inside the image processing apparatus M, no limitation is made to this structure, and as long as the structure is such that the document data scanned from an original document can be resultantly acquired in the document data management apparatus 1, the invention can be applied.

Besides, in the foregoing embodiments, although the structure is such that the determination of the reliability of the image reading processing of the image reading apparatus 2 is performed in the image processing apparatus M, no limitation is made to this, and the determination may be executed on an external equipment connected to be capable of communicating with the image processing apparatus M. Similarly, it is not always necessary that the specified data used for the determination of the reliability of the image reading processing in the reliability determination unit 102 is stored in the document data management apparatus 1 or the image processing apparatus M, and it can also be acquired from an external equipment as the need arises.

Besides, when the evaluation value is calculated based on the coincidence rate between the object of the character string included in the document data and the specified character string, it is not always necessary to obtain the coincidence rate with respect to the whole of the character strung as the object, and for example, in the case of "AAA Kabushiki Kaisha", when the coincidence rate is obtained only for the character string portion of "AAA", the reliability of read content can be determined at higher accuracy.

As stated above, the foregoing embodiments are structured such that at the time point when a paper document is scanned, it is checked whether the created electronic data is in the form suitable for the registration into the specified workflow, and the data as the degree of the reliability is directly added to the electronic data of the object. Whether digitization is performed is automatically determined by referring to the data to which the information indicating the degree of the reliability is added as stated above, so that labor at the time of using the data afterward can be reduced.

Besides, in the case where the metadata indicating the reliability of the scan processing is embedded into the electronic data main body, as the index at the time when the electronic data is retrieved, only the data with high scores in the reliability of the scan processing can be extracted, or only the data with low scores can be extracted, and the degree of freedom of management of the electric data can be improved.

Although the invention has been described in detail by use of the specific mode, it would be apparent for one of ordinary skill in the art that various modifications and improvements can be made without departing from the sprit and scope of the invention.

As described above in detail, according to the invention, in the document data management apparatus to perform the management of document data read and digitized by the image reading apparatus, the management of the document data is performed in view of the reliability of the image reading processing of the image reading apparatus, so that the reliability of various processings using the document data can be improved.

What is claimed is:

1. A document data management apparatus comprising:
a processor;
a memory communicatively coupled to the processor, the memory having stored therein computer-executable instructions configured to implement the document data management apparatus, including:
a document data acquisition unit configured to acquire document data read and digitized by an image reading apparatus;
a reliability determination unit configured to perform a layout analysis on the document data to determine whether the document data corresponds to a scanned image having a registered format, to compare a character string of an object extracted by the layout analysis with a specified character string corresponding to a kind of the object if the document data corresponds to a scanned image having the registered format, and to determine reliability of an image reading processing of the image reading apparatus for the document data based at least in part on a determined correspondence between the character string of the object and the specified character string, wherein the specified character string is determined based on the registered format; and a storage prohibition unit configured to prohibit, with respect to the document data for which the reliability determined by the reliability determination unit is lower than a specified threshold value, storage of the document data.

2. The document data management apparatus according to claim 1, wherein the reliability determination unit is configured to determine the reliability of the image reading processing of the image reading apparatus based on the object extracted by the layout analysis and a specified object.

3. The document data management apparatus according to claim 1, wherein the reliability determination unit is configured to determine the reliability of the image reading processing of the image reading apparatus based on a coincidence rate between the character string of the object extracted by the layout analysis and the specified character string.

4. The document data management apparatus according to claim 1, wherein the reliability determination unit is configured to determine the reliability of the image reading processing of the image reading apparatus based on an amount of shift of a position, on an image, of the object extracted by the layout analysis from a specified position corresponding to the object.

5. The document data management apparatus according to claim 1, wherein the reliability determination unit is configured to determine the reliability of the image reading processing of the image reading apparatus based on an inclined angle of the character string of the object extracted by the layout analysis.

6. The document data management apparatus according to claim 1, wherein the document data acquisition unit is configured to store the document data as a normal scan processing if the reliability determination unit determines that the document data does not correspond to a scanned image having the registered format.

7. A document data management apparatus comprising:
a processor;
a memory communicatively coupled to the processor, the memory having stored therein computer-executable instructions configured to implement the document data management apparatus, including:
a document data acquisition unit configured to acquire document data read and digitized by an image reading apparatus;
a reliability determination unit configured to perform a layout analysis on the document data acquired by the document data acquisition unit and to determine reliability of an image reading processing of the image reading apparatus for the document data based on a coincidence rate between a character string of an object extracted by the layout analysis and a specified character string corresponding to the object; and
an association unit configured to associate the document data acquired by the document data acquisition unit with the reliability determined by the reliability determination unit for the document data and to store the document data and the reliability into a specified storage area if the reliability determined by the reliability determination unit is higher than a specified threshold value.

8. The document data management apparatus according to claim 7, wherein the reliability determination unit is configured to perform a layout analysis on the document data acquired by the document data acquisition unit, and to determine the reliability of the image reading processing of the image reading apparatus for an object extracted by the layout analysis based on the object and a specified object, and
the associating unit is configured to associate the reliability determined for the object by the reliability determination unit with the object in the document data acquired by the document data acquisition unit and to embed the object and the reliability into the document data.

9. The document data management apparatus according to claim 7, wherein the reliability determination unit is configured to perform a layout analysis on the document data acquired by the document data acquisition unit, and to determine the reliability of the image reading processing of the image reading apparatus based on an object extracted by the layout analysis and a specified object.

10. The document data management apparatus according to claim 7, wherein the reliability determination unit is configured to perform a layout analysis on the document data acquired by the document data acquisition unit, and to determine the reliability of the image reading processing of the image reading apparatus based on a coincidence rate between a character string of an object extracted by the layout analysis and a specified character string corresponding to a kind of the object.

11. The document data management apparatus according to claim 10, wherein the reliability determination unit is configured to determine whether the document data corresponds to a scanned image having a registered document format, and the specified character string is selected based on the registered document format.

12. The document data management apparatus according to claim 7, wherein the reliability determination unit is configured to perform a layout analysis on the document data acquired by the document data acquisition unit, and to determine the reliability of the image reading processing of the image reading apparatus based on a character string of an object extracted by the layout analysis and a specified format corresponding to a kind of the object.

13. The document data management apparatus according to claim 7, wherein the reliability determination unit is configured to perform a layout analysis on the document data acquired by the document data acquisition unit, and to determine the reliability of the image reading processing of the image reading apparatus based on an amount of shift of a position, on an image, of an object extracted by the layout analysis from a specified position corresponding to the object.

14. The document data management apparatus according to claim 7, wherein the reliability determination unit is configured to perform a layout analysis on the document data acquired by the document data acquisition unit, and to determine the reliability of the image reading processing of the image reading apparatus based on an inclined angle of a character string of an object extracted by the layout analysis.

15. A document data management apparatus comprising:
a processor;
a memory communicatively coupled to the processor, the memory having stored therein computer-executable instructions configured to implement the document data management apparatus, including:

a document data acquisition unit configured to acquire document data read and digitized by an image reading apparatus;

a reliability determination unit configured to perform a layout analysis on the document data acquired by the document data acquisition unit to determine whether the document data was obtained from a scanned image having a registered format, and to determine, if it is determined that the document data was obtained from a scanned image having the registered format, reliability of an image reading processing of the image reading apparatus for the document data based at least in part on a comparison between a character string of an object extracted by the layout analysis and a specified character string corresponding to a kind of the object, wherein the specified character string is determined based on the registered format; and a notification unit configured to notify, if the reliability determined by the reliability determination unit is lower than a specified threshold value, that the reliability of the image reading processing of the image reading apparatus is low with respect to the document data for which the reliability is determined.

16. The document data management apparatus according to claim 15, wherein the reliability determination unit is configured to determine the reliability of the image reading processing of the image reading apparatus based on the object extracted by the layout analysis and a specified object.

17. The document data management apparatus according to claim 15, wherein the reliability determination unit is configured to determine the reliability of the image reading processing of the image reading apparatus based on a coincidence rate between the character string of the object extracted by the layout analysis and the specified character string.

18. The document data management apparatus according to claim 15, wherein the reliability determination unit is configured to determine the reliability of the image reading processing of the image reading apparatus based on an amount of shift of a position, on an image, of the object extracted by the layout analysis from a specified position corresponding to the object.

19. The document data management apparatus according to claim 15, wherein the reliability determination unit is configured determine the reliability of the image reading processing of the image reading apparatus based on an inclined angle of the character string of the object extracted by the layout analysis.

20. The document data management apparatus according to claim 15, wherein the document data acquisition unit is configured to store the document data as a normal scan processing if the reliability determination unit determines that the document data does not correspond to a scanned image having the registered format.

\* \* \* \* \*